United States Patent [19]
Pantus

[11] Patent Number: 4,625,199
[45] Date of Patent: Nov. 25, 1986

[54] COMBINATION INTRUSION DETECTOR SYSTEM HAVING CORRELATED ULTRASONIC AND MICROWAVE DETECTION SUB-SYSTEMS

[75] Inventor: Math M. J. Pantus, Brunssum, Netherlands

[73] Assignee: American District Telegraph Company, New York, N.Y.

[21] Appl. No.: 691,156

[22] Filed: Jan. 14, 1985

[51] Int. Cl.[4] .......................................... G08B 19/00
[52] U.S. Cl. ..................................... 340/522; 340/521; 340/551; 340/554; 340/561; 340/565; 367/94
[58] Field of Search ............... 340/522, 521, 500, 506, 340/541, 551, 554, 561, 565, 566; 367/93, 94

[56] References Cited

U.S. PATENT DOCUMENTS

| | | | |
|---|---|---|---|
| 3,074,053 | 1/1963 | McDonough et al. | 340/522 |
| 3,074,054 | 1/1963 | Pearson | 340/522 |
| 3,801,978 | 4/1974 | Gershberg et al. | 340/522 |
| 3,846,778 | 11/1974 | Galvin et al. | 340/522 |
| 3,946,376 | 3/1976 | Galvin | 340/522 |
| 4,195,286 | 3/1980 | Galvin | 340/522 |
| 4,401,976 | 8/1983 | Stadelmayr | 340/522 |
| 4,405,919 | 9/1983 | Scheidweiler | 340/522 |

Primary Examiner—Donnie L. Crosland
Attorney, Agent, or Firm—Weingarten, Schurgin, Gagnebin & Hayes

[57] ABSTRACT

A motion alarm system having a combination of microwave and ultrasonic subsystems is operative to reliably detect true moving targets and to discriminate false targets both caused by target motion reflected outside the surveillance space and by noise and other interfering phenomena. Microwave and ultrasonic signals received from the surveillance space are separately processed to provide ultrasonic motion detection signals and a microwave motion detection signal. A signal processing circuit interdependently combines the signals for producing a correlated system event signal. The presence of a true moving target within the surveillance space produces sufficient correlation to cause the system event signal to meet predetermined alarm criteria. The presence of either interfering phenomena or unwanted reflected outside signals, or both simultaneously, produces insufficient correlation to cause the system output signal to meet the predetermined criteria. An alarm status is thereby only provided in response to a true moving target within the surveillance space, but not in response to the occurrence of error producing sources for the sub-systems individually or collectively.

16 Claims, 14 Drawing Figures

COMBINATION INTRUSION DETECTOR SYSTEM HAVING CORRELATED ULTRASONIC AND MICROWAVE DETECTION SUB-SYSTEMS

FIELD OF THE INVENTION

The instant invention is directed to the field of intrusion detection and alarm systems, and more particularly, to a novel combination intrusion detection system that substantially eliminates both false alarms and failure of alarm situations.

BACKGROUND OF THE INVENTION

The usefulness of an intrusion detection system critically depends on its capability to distinguish an alarm condition initiated by an actual unauthorized intruder from either a false alarm or a failure of alarm produced by noise, some atmospheric disturbance, an animal, alterations in the placement and state of operability of protected area equipment, and change in actual versus the design range, among other things. Ultrasonic intrusion detection systems are not only subject to false alarm indications in response to drafts and air movements as well as in response to ultrasonic noises such as caused by bells and hissing but also are subject to failure of alarm situations in response to changes from nominal range occasioned by variations in the ultrasonic propagation medium. Microwave intrusion detection systems produce false alarms in response to water movement in plastic pipes, in response to energy received from beyond the protected area due to wall and window penetration, and also in response to unwanted reflections, among other things.

The sources that adversely affect the performance of ultrasonic detection systems are in general different from those that give rise to false alarms and failures of alarm for microwave detection systems, and conversely. Thus, while drafts, air movements, and ultrasonic noises adversely affect ultrasonic system performance, none of them poses a significant detection problem for microwave systems. Similarly, while water movement in plastic pipes, wall or window penetration, and reflections give rise to false alarms for microwave intrusion detection systems such events are not obstacles to accurate detection for ultrasonic systems.

Galvin, U.S. Pat. No. 4,195,286, issued Mar. 25, 1980 and assigned to the same assignee as the instant invention, discloses a combination detection system providing both a high and a low probability system output signal. The high probability output signal system is produced by a logical AND circuit coupled to the output of at least two independent sensors that is only operative in response to the simultaneous presence of the several sensor outputs. The occurrence of any one of the error producing sources for less than all of the independent sensors thus fails to produce a system alarm signal indication. The exclusive occurrence, then, of any one of the sources that give rise to ultrasonic false detections such as bells or hissing, or the exclusive occurrence of any one of the microwave system error sources such as water movement in plastic pipes, fails to enable the AND gate and inhibits the production of an erroneous system alarm signal indication.

Combination detection systems based on an AND detection principle produce a system alarm signal whenever its inputs are simultaneously present irrespectively of whether the inputs represent true intruder motion or arise from error producing sources, so that they often produce an erroneous alarm indication. Such an event could occur, for example, if a microwave system in penetrating the walls of a protected area returns an indication of someone present on the street beyond, while an ultrasonic system simultaneously produces an erroneous indication of intruder presence in response to an air conditioner being turned on in the protected area.

Other disadvantages of combined detection systems using "AND" detection verification include the necessity for controlling the range of the microwave and ultrasonic systems separately, the need for separately walk-testing each of the systems individually, and the fact that the combined system degrades to that one of its independent sub-systems not subject to the error producing condition. Reference may be had to U.S. Pat. Nos. 3,074,054, and 3,074,053, for other combination detection systems based on an "AND" function detection principle.

SUMMARY OF THE INVENTION

The present invention contemplates an intrusion detection system having two or more detection sub-systems each based on a different detection principle and each producing a sub-system detection output signal having identifiable and distinguishable characteristics, contemplates means for interdependently combining the several sub-system outputs to provide a system event signal having an identifiable characteristic that varies both in dependence on the simultaneous presence of the several different sub-system outputs and in dependence on a preselected correlation between the identifiable and distinguishable characteristics of the several detector sub-system outputs, and further contemplates means responsive to whether the characteristic of the system even detection signal meets a predetermined criteria to provide an alarm signal indication of an unauthorized intruder.

The intrusion detection system of the present invention is preferred embodiment includes an ultrasonic detection sub-system and a microwave detection sub-system. The ultrasonic detection sub-system includes means responsive to ultrasonic energy received from the protected space to provide Doppler bi-directional intruder motion detection signals. The microwave sub-system includes means responsive to received microwave energy to provide a Doppler radar intrusion detection signal. Means are provided responsive to the ultrasonic sub-system Doppler bi-directional intruder motion detection signals and to the microwave sub-system Doppler radar intruder detection signal to produce a bi-polar system event detection signal that is present only when the Doppler radar detection signal and either of the ultrasonic bi-directional motion signals are simultaneously present, and that has a temporarily varying magnitude that varies in dependence on the correlation between the Doppler radar detector signal and both of the bi-directional motion detection signals. Means are provided for processing the bi-polar system event detection signal to provide an alarm signal indication of intruder presence only when the magnitude of the bi-polar system event detection signal exceeds a predetermined bi-polar threshold level. Means operative to enable the microwave sub-system in response to the predetermined characteristic of said ultrasonic intrusion detection signals are provided to conserve electrical power usage. The microwave sub-system need not be continuously active but only if and in the event of a possible detection by the ultrasonic sub-system. Multiple detectors emboding the invention in this manner may advantageously be utilized in and around a given protected area, since any potentially interfering radar most probably is in its inactive state.

The present invention substantially eliminates both failure of alarm situations and false alarms. The occasion of any one of the sources of alarm indication error for either the ultrasonic sub-system or for the microwave sub-system alone but not in combination cannot produce an alarm indication of intruder presence. False alarm indications are prevented by the responsiveness of the system event detection signal providing means only to the simultaneous presence of the several detector sub-system outputs. In addition, the simultaneous presence of any one of the sources of microwave sub-system error producing sources together with any one of the ultrasonic sub-system error producing sources also cannot produce a false alarm indication of intruder presence. The simultaneous existance of any one of the sources of ultrasonic error together with any one of the causes of microwave error produces insufficient correlation gain between the several detector sub-system output signals to allow the bi-polar system event detection signal to have a magnitude that exceeds the preselected bi-polar alarm threshold limit. The confidence level for the performance of the system is thus very high, and system performance does not degrade to the confidence level provided by any one of the sub-systems individually notwithstanding the existance of sub-system error producing sources being present in or around a controlled and protected environment.

The intrusion detection system of the present invention is reliable in use and readily installable with a minimum of installation steps. The present invention eliminates the need for walk-testing of the sub-systems individually, it being only necessary to have a single walk-test that establishes the operability of the whole system. The intrusion detector system of the present invention, moreover, is substantially insensitive to atmospheric induced range variations, and is responsive to substantially one event only, a true unauthorized intruder.

BRIEF DESCRIPTION OF THE DRAWINGS

These and other features and attendant advantages of the present invention will become apparent as the invention becomes better understood by referring to the following exemplary and non-limiting detailed description of the preferred embodiment, and to the drawings, wherein.

DETAILED DESCRIPTION OF THE PREFERRED EMBODIMENT

The present invention in its broad aspect relates to a combination detector system in which several detection sub-systems outputs based on distinct detection principles are correlated to produce a combined system event detection signal having an identifiable characteristic representative of a true detectable condition. The present invention further relates to detection means selected to be responsive to the identifiable characteristic of the combined system event detection signal to distinguish true system events from false and/or failure of alarms. While the system of the invention thus has wide application, it has particular utility for a combination ultrasonic and microwave detection system.

Figure 1:
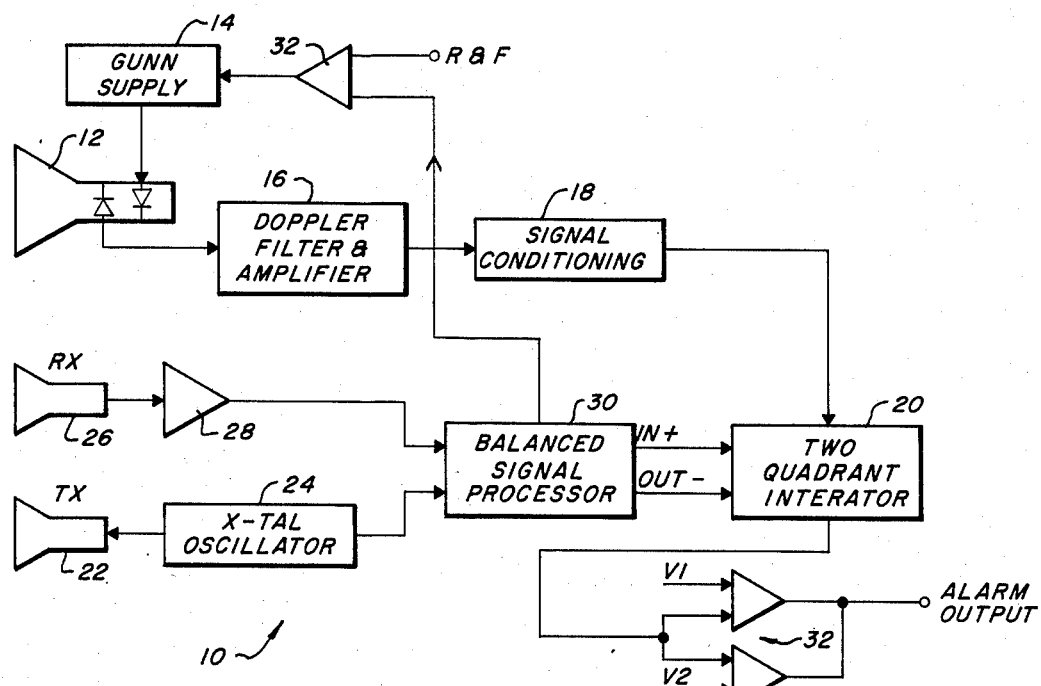
FIG. 1 is a block diagram of a combination intrusion detector system having correlated ultrasonic and microwave detection sub-systems according to the present invention.

Referring now to FIG. 1, generally designated at 10 is a combination intrusion detector system having correlated ultrasonic and microwave detection sub-systems according to the present invention. The system 10 includes a microwave transceiver 12 having a gunn supply 14 associated therewith in the usual manner for transmitting microwave energy into, and receiving return microwave energy from, a protected volume such as a corridor, a room, a warehouse, and the like. The microwave energy may be continuously supplied or pulsed, and the term "simultaneous" as used herein is meant to include both possibilities. Energy at microwave frequency that is received by the transceiver 12 is filtered, to separate the Doppler component representative of intruder motion within the protected volume, and amplified in a Doppler filter and amplifier 16. A signal conditioning circuit 18 conditions the amplified analog Doppler detection signal to remove undesirable noise, such as high frequency fluorescent light effects and low frequency insect effects. The amplified and selectively conditioned radar Doppler detection signal is applied to a two quadrant integrator 20.

An ultrasonic transmitter 22 fed by a crystal oscillator 24 operative, for example, at a 26.3 kilohertz carrier frequency, is provided for transmitting ultrasonic energy into the volume to be protected. The ultrasonic energy may be transmitted either simultaneously into the protected volume together with the microwave energy or it may be transmitted thereinto singly but in such a way that the microwave system is actuated in the event of ultrasonic sub-system intrusion detection so that overall system power usage is conserved.

An ultrasonic receiving transducer 26 is provided, for example, on a wall confronting the protected volume, for receiving ultrasonic energy from the protected volume. The received ultrasonic energy is amplified by an amplifier 28, and the amplified received ultrasonic energy is applied to a balanced signal processor 30 to be described. The balanced signal processor 30 is operative in response to the received and amplified ultrasonic energy, and to the carrier frequency, to provide Doppler bi-directional intruder motion detection signals designated "IN+", "OUT−" representative of the radial component of intruder motion within the protected volume respectively towards and away from the receiver 26.

A comparator 32 having a preselected reference ("REF") input voltage is coupled to the microwave transceiver 12 and the balanced signal processor 30 to actuate the transceiver 12 in response to received ultrasonic energy having a magnitude that exceeds the preselected reference. As has already been mentioned above, the power consumption of the system is minimized by only actuating the microwave detection sub-system intermittently whenever the ultrasonic detection sub-system is operative to detect a probable unauthorized intruder motion.

The two quadrant integrator 20 is responsive to the conditioned radar Doppler detection signal and to the Doppler bi-directional ultrasonic detection signals to produce a system event detection signal having a magnitude that depends upon the simultaneous presence of the sub-system inputs as well as upon the correlation between the inputs. The correlated system event detection signal is applied to a bi-polar dual comparator generally designated 32 having preselected bi-polar thresholds designated "V1", "V2". Should the magnitude of the correlated system event detector signal exceed either one of the preselected thresholds, the corresponding comparator is actuated producing an alarm signal indication of unauthorized intruder motion. In the presence of interferring ultrasonic phenomena or unwanted microwave error producing phenomenon, or both simultaneously, the correlated system event detection signal produced by the integrator 20 has a magnitude insufficient to cross either of the predetermined comparator thresholds. The system 10 of the present invention thus effectively substantially eliminates both false alarms and failure of alarm situations providing true volume protection and constant day-to-day performance characteristics with a high system confidence level. The system 10 eliminates the need for range control adjustments, and requires but a single walk-test to determine the operability of the whole system during its installation and routine maintenance.

Figure 2:
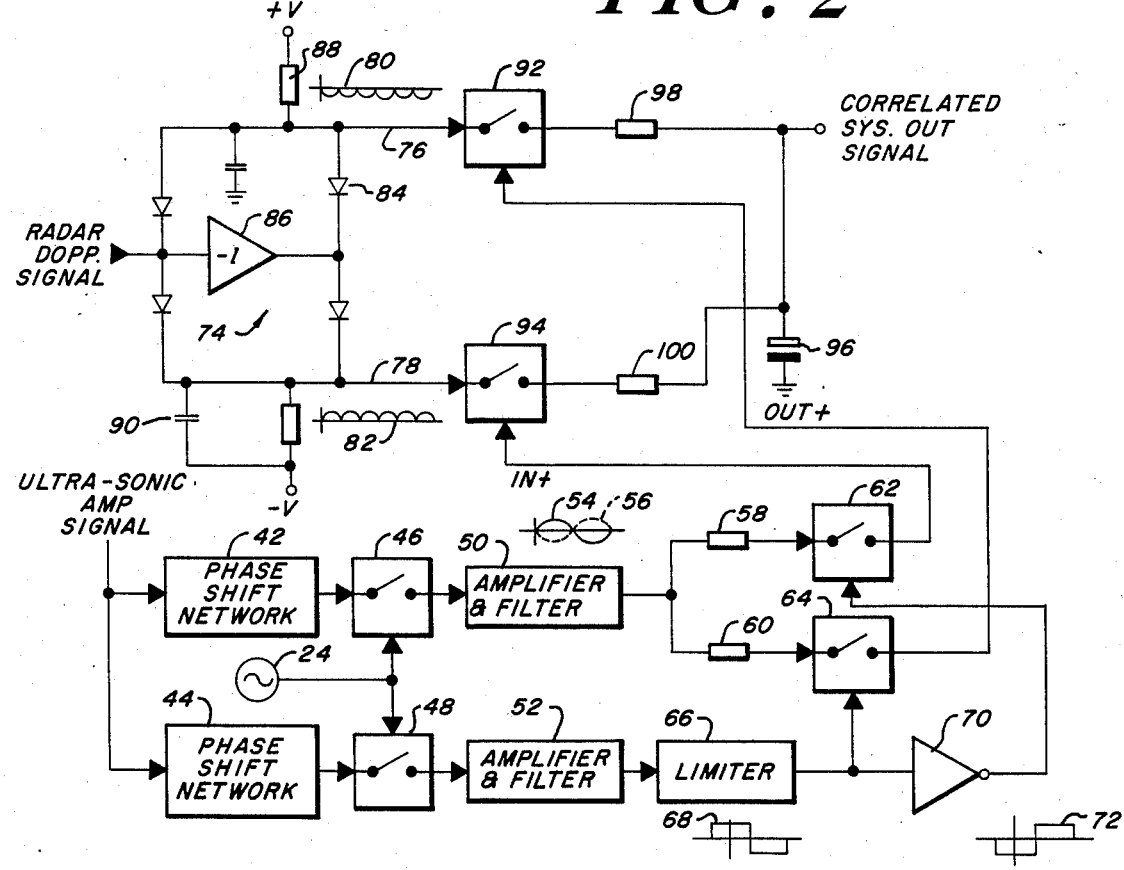
FIG. 2 is a block diagram illustrating a subcombination of the combination intrusion detector system having correlated ultrasonic and microwave detection sub-systems according to the present invention.

Referring now to FIG. 2, generally designated at 40 is a block diagram illustrating the bi-polar integrator and balanced signal process of the combination intrusion detector system having correlation microwave and ultrasonic detection sub-systems according to the present invention. The balanced signal processor includes a phase shift network 42 and a phase shift network 44 that are operative in response to the ultrasonic amplified signal produced by the amplifier 28 (FIG. 1) to provide quadrature ultrasonic detection signals. The quadrature ultrasonic detection signals are mixed with the carrier frequency signal produced by the oscillator 24 and synchronously detected to baseband by mixers 46, 48. The quadrature detected baseband signals are individually Doppler bandpass filtered by amplifier and filter circuitry 50, 52. As illustrated at 54 in solid line and 56 in dashed line, a 180° phase relation subsists between the Doppler detected signals respectively representative of radial motion towards and away from the ultrasonic receiver 26 (FIG. 1).

The Doppler quadrature signal produced by the amplifier and filter 50 is fed in parallel circuit legs through resistors 58, 60 respectively to sample and hold devices 62, 64. The other Doppler quadrature signal produced by the amplifier and filter 52 is fed to a symmetrical limiter 66 that is operative to produce therefrom a square-wave signal 68 synchronous with and in 90° phase offset to the Doppler detected quadrature signal produced at the output of the amplifier and filter 50. The square wave signal 68 is inverted in an invertor 70, that is operative to produce a square wave signal 72 at its output in 180° phase offset to the signal 68.

The square wave signals 68, 72 are synchronously applied as sampling enabling pulses to the sample and hold devices 62, 64 respectively. The sample and hold devices 62, 64 are enabled by the positive edge of the respective square-wave signals 68, 72 synchronously with the signals 54, 56.

For true intruder motion either radially towards or away from the ultrasonic receiver, a respective one of the sample and hold circuits 62, 64 will be consistently enabled producing a corresponding one of the Doppler bi-directional ultrasonic detection sub-system signals designated "IN+", "OUT−" much more often statistically than the other one of the sample and hold circuits in correspondence with the sense of the intruder motion. For ultrasonic noise and other sources of ultrasonic detection sub-system error, however, individual ones of the bi-directional signals will be more or less produced in random relation to the other one of the signals and in such a way that neither of the bi-directional detection signals will be statistically present more often than the other. Reference may be had to Galvin, U.S. Pat. No. 3,760,400, issued Sept. 18, 1983 and assigned to the same assignee as the instant invention, incorporated herein by reference, for a disclosure of alternate exemplary balanced signal processor embodiments.

A bi-polar rectifying network generally designated 74 responsive to the Doppler radar detection signal produced by the signal conditioning network 18 (FIG. 1) is operative to provide on circuit legs 76, 78 equal but opposite magnitude full-wave rectification signals 80, 82. The bi-polar rectifying network 74 preferably includes diodes 84 connected in a standard bridge arrangement, an analog invertor 86 connected across the diode bridge, and diode pre-biasing resistors 88 and transient-dumping capacitors 90 connected in series with the diode bridge.

The bi-polar full-wave rectified radar Doppler detector signals 80, 82 appearing on the legs 76, 78 are respectively applied to mixers 92, 94, and the ultrasonic sub-system Doppler bi-directional motion detection signals designated "OUT−", "IN+" are respectively applied thereto. The output of the mixer 92 is coupled to a capacitor 96 via a resistor 98, and the output of the mixer 94 is coupled to the capacitor 96 via a resistor 100. The capacitor 96 together with a corresponding one of the resistors 98, 100 functions as a bi-polar two quadrant integrator. The mixers 92, 94 are preferably gate enabled switches.

Figure 3A:
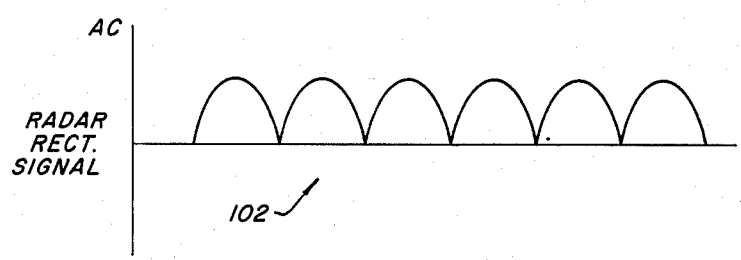
FIGS. 3A–3C, 4A–4C, 5A–5C, and 6A–6C are stylized graphs useful in illustrating the operation of the combination intrusion detector system having correlated ultrasonic and microwave detection sub-systems according to the present invention.
Figure 3B:
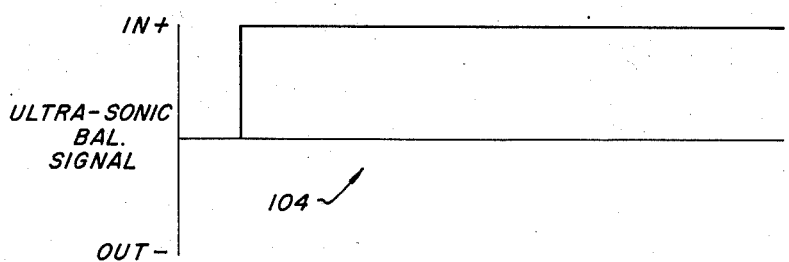
Figure 3C:
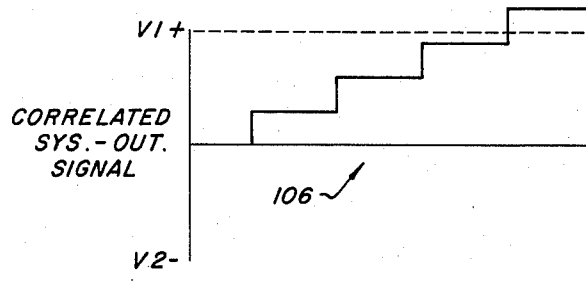

In operation and referring now to FIG. 3, which illustrates system operation in detecting a true system event, generally designated at 102 in FIG. 3A is the postive Doppler radar rectified detection signal; generally designated at 104 in FIG. 3B is the "IN" ultrasonic Doppler detection signal; and generally designated at 106 in FIG. 3C is the correlated system output signal of the bi-polar two quadrant integrator. For true intruder motion having a radial component toward the ultrasonic detection sub-system receiver, as illustrated, the output of the balanced integrator will be a wave having an essentially constant amplitude as illustrated at 104 in FIG. 3B, while the ultrasonic detection sub-system output, not shown, representative of intruder motion radially away from the ultrasonic receiver will essentially have a constant negative magnitude. The "IN" ultrasonic detection signal 104 enables the mixer 92 (FIG. 2) for the positive full-wave rectified Doppler radar detection signal. The bi-polar integrator 98, 96 (FIG. 2) produces the signal 106 having a magnitude that uniformly increases so long as the two detection sub-system signals applied to the mixer are both simultaneously present and are correlated. The uniformly increasing charge on the integrator quickly slews the integrator voltage through the detection threshold, designated "V1+" in FIG. 3C, and the dual comparator 32 (FIG. 1) is operative to produce an alarm indication of intruder motion. A similar process occurs whenever the negative full-wave rectified radar Doppler detection signal and the radially outgoing ultrasonic detection signal are both simultaneously present and appropriately correlated.

Figure 4A:
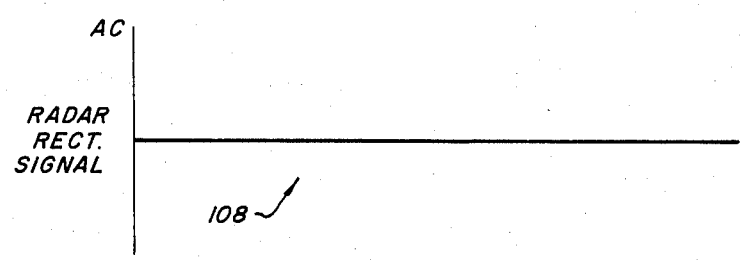
Figure 4B:
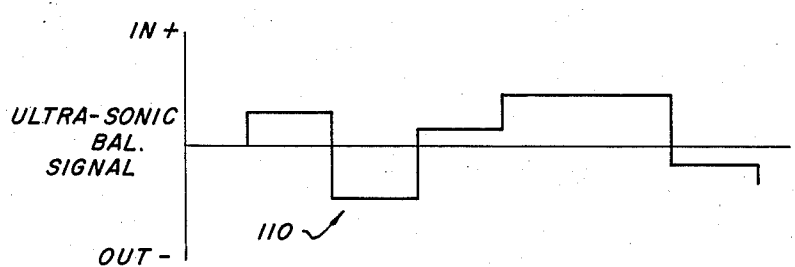
Figure 4C:
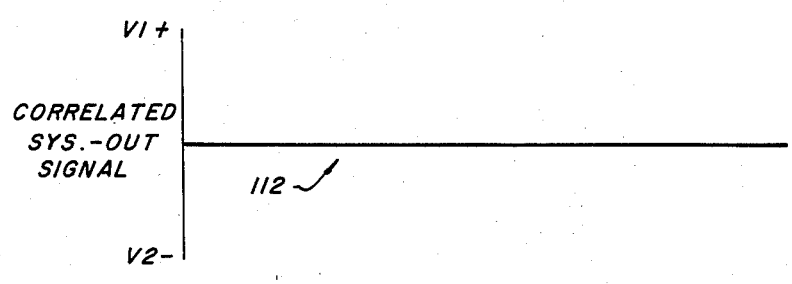

Referring now to FIG. 4, an example is illustrated for the case where a source of ultrasonic detection sub-system error is occuring but the microwave detection sub-system is producing no detection output. The example may, for instance, either correspond to moving air currents such as from an air processing system or may correspond to a source of ultrasonic noise being present in the protected volume such as a bell. For this case, the radar rectification signal produced by the microwave detection sub-system will be a horizontal line generally designated 108 in FIG. 4A and the bi-directional output signals produced by the ultrasonic detector sub-system will be a randomly varying stepped wave form generally designated 110 in FIG. 4B. The bi-polar integrator is operative in response to the inputs 108, 110 to provide a horizontal output generally designated 112 in FIG. 4C, since, as will be appreciated, the absence of any received radar Doppler energy precludes the possibility of charge and voltage build-up on the bi-polar integrator.

Figure 5A:
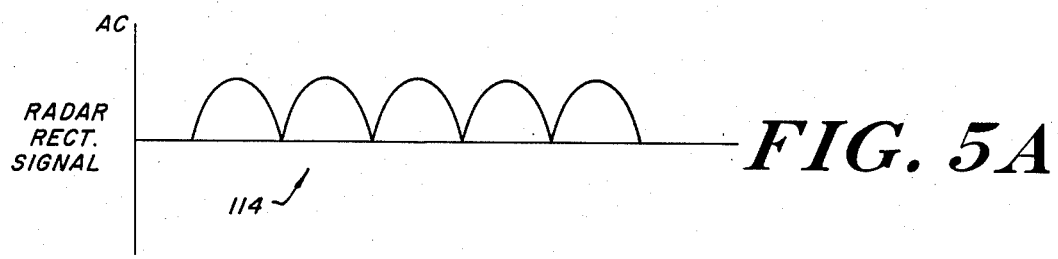
Figure 5B:
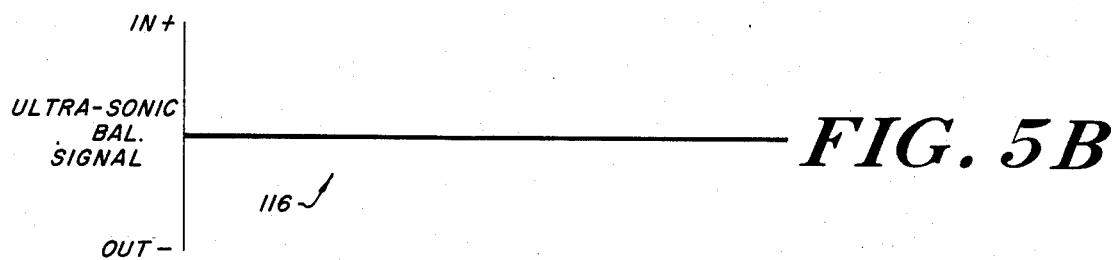
Figure 5C:
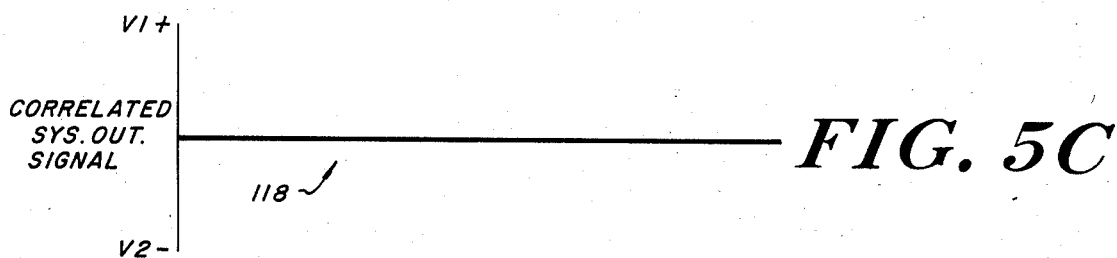

FIG. 5 illustrates the case where a microwave sub-system error producing source such as water flowing through a plastic pipe is occuring but there is no similar detectable event for the ultrasonic detection sub-system. Here, the microwave detection sub-system produces an exemplary positive full wave rectified radar Doppler detection signal generally designated 114 in FIG. 5A, and the ultrasonic detection sub-system produces a generally horizontal bi-directional output signal generally designated 116 in FIG. 5B. As for the case illustrated in FIG. 4, the absence of the simultaneous occurrence of detectable signals from the several detection sub-systems precludes the possibility of charge and voltage build-up on the bi-polar integrator which produces a generally horizontal correlated system event output signal generally designated 118 in FIG. 5C.

Figure 6A:
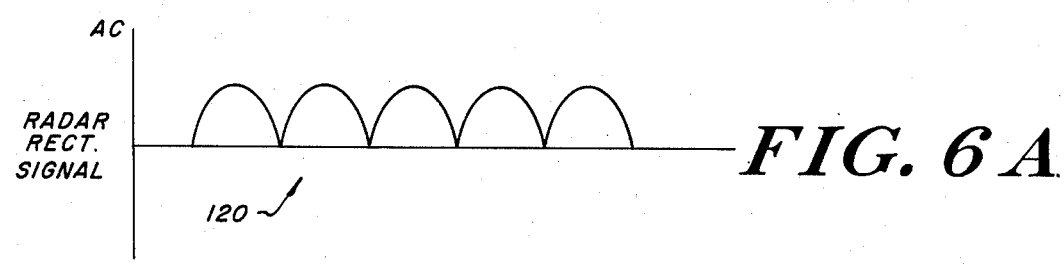
Figure 6B:
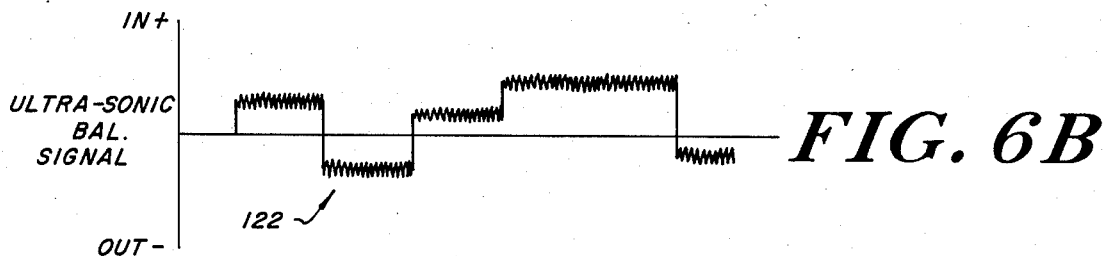
Figure 6C:
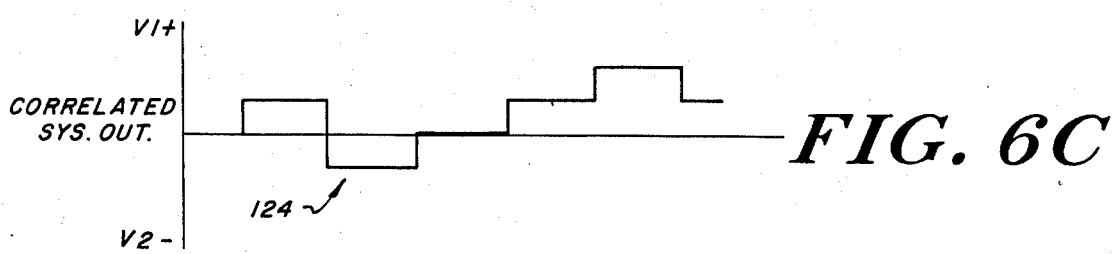

Referring now to FIG. 6 which illustrates the simultaneous occurrence of both an error source for the microwave sub-system as well for the ultrasonic sub-system but not for a true event, generally designated at 120 in FIG. 6A is a wave-form illustrating the Doppler detected radar return energy such as from outside motion; generally designated at 122 in FIG. 6B is a waveform illustrating the bi-directional ultrasonic motion detector signals such as from ultrasonic hissing; and generally designated at 124 in FIG. 6C is the correlated system output signal produced by the two quadrant integrator according to the present invention. Notwithstanding the simultaneous occurrence of both microwave and ultrasonic sub-system detection signals, the randomly varying nature of the noise waveform 122 produced by the ultrasonic detection sub-system has insufficient correlation either "IN" or "OUT" to provide a two quadrant integrator output signal having sufficient correlation gain to cross either of the bi-polar thresholds. The combination intrusion detector system having correlated ultrasonic and microwave detection sub-systems of the present invention is thus capable of distinguishing true intruder motion from simultaneously occuring error producing sources for each of the several sub-systems thereby providing a very high confidence level motion detection system.

It will be appreciated that many modifications of the presently disclosed invention will become apparent to those skilled in the art without departing from the scope of the appended claims.

What is claimed is:

1. An intrusion detector system, comprising:
   first means for providing first and second motion detection signals in response to ultrasonic energy received from a protected volume that are respectively representative of motion in opposite directions;
   second means for providing a third motion detection signal in response to microwave energy received from the protected volume; and
   third means coupled to said first means and to said second means and operative in response to said first, to said second, and to said third motion detection signals for providing an alarm signal indication of intruder motion in the protected volume when at least one of said first and said second signals are simultaneously present with said third signal and when one of only one of said first and said second signals is correlated with said third signal.

2. The invention of claim 1, wherein said first means include an ultrasonic transmitter for transmitting ultrasonic energy into the protected volume; an ultrasonic receiver for receiving ultrasonic energy from the protected volume; means for demodulating the received ultrasonic energy into first and second quadrature baseband signals; and means responsive to said first quadrature baseband signal for providing said first and said second signals synchronously from said second quadrature baseband signal.

3. The invention of claim 2, wherein said second means includes a microwave transceiver having a Gunn supply; and means responsive to received microwave energy to provide said third motion detection signal.

4. The invention of claim 3, further including means coupled to said gunn supply and to said other one of said quadrature baseband signals for actuating said gunn supply in response thereto.

5. The invention of claim 3, wherein said third means includes a bi-polar integrator, and means coupled to said integrator and said first and second means responsive to said first, said second, and said third detection signals for unidirectionally charging said bi-polar integrator when at least one of said first and second signals are simultaneously present with said third signal and when only one of said first and said second signals is correlated with said third signal, and for bi-directionally charging said bi-polar integrator when any one of said first and second signals are simultaneously present with said third signal and when both of said first and said second signals are correlated with said third signal.

6. The invention of claim 5, wherein said third means further includes a dual threshold comparator connected to said bi-polar integrator.

7. An intrusion detection system, comprising:
   two detection sub-systems each based on a different detection principle and respectively producing a first and a second sub-system detection output signal respectively having first and second identifiable and distinguishable characteristics in response to the detection of events respectively detectable by the two detection sub-systems;
   means for interdependently combining the several sub-system outputs to provide a system event signal that exists if and only if the first and the second sub-system detection output signals are simultaneously present and that has a third identifiable characteristic that directly varies in dependence on the correlation between the first and second identifiable and distinguishable characteristics of the first and second detector sub-system output signals; and means responsive to whether the third characteristic of the system event detection signal meets a predetermined criteria to provide an alarm signal indication of an unauthorized intruder.

8. The system of claim 7, wherein said third identifiable characteristic is a magnitude.

9. The invention of claim 7, wherein said first, said second, and said third detection output signals are analog signals.

10. The invention of claim 9, wherein said third signal characteristic is an analog magnitude.

11. The invention of claim 7, wherein said predetermined criteria is a voltage level.

12. The invention of claim 7, wherein said system event signal providing means includes a mixer responsive to said first and said second signal characteristics.

13. A combination ultrasonic and microwave intrusion detector system, comprising:

an ultrasonic detector sub-system operative to provide an ultrasonic detection signal in response to the detection of true Doppler intruder motion as well as to the detection of false ultrasonic sub-system error producing events;

a microwave detector sub-system operative to provide a microwave detection signal in response to the detection of true Doppler intruder motion as well as to the detection of false microwave sub-system error producing events;

combining means coupled to the ultrasonic and to the microwave subsystems and operative in response to said ultrasonic detection signal and to said microwave detection signal to provide an output signal that exists if and only if said ultrasonic detection signal and said microwave detection signal are simultaneously present, that has a first identifiable characteristic other than existence representative of the detection of true Doppler intruder motion, and that has a second identifiable characteristic other than said first characteristic representative of the joint detection of false ultrasonic and microwave error producing events; and alarming means coupled to the output signal providing means for discriminating said first characteristic from said second characteristic and for providing an alarm signal indication of intruder motion only in response to said first characeristic but not in response to said second identifiable characteristic.

14. The invention of claim 13, wherein said output signal providing means includes a correlator.

15. The invention of claim 14, further including an integrator connected to the output of said correlator.

16. The invention of claim 15, wherein said integrator is a bi-polar integrator.

* * * * *

UNITED STATES PATENT AND TRADEMARK OFFICE
CERTIFICATE OF CORRECTION

PATENT NO. : 4,625,199

DATED : November 25, 1986

INVENTOR(S) : Math M. J. Pantus

It is certified that error appears in the above-identified patent and that said Letters Patent is hereby corrected as shown below:

ABSTRACT, line 2, "subsystems" should read --sub-systems--.

Column 1, lines 66-67, "irrespec-tively of" should read --irrespec-tive of--.

Column 2, line 36, "even" should read --event--.

Column 2, line 40, "is" should read --in--.

Column 2, line 65, "the predetermined" should read --a predetermined--.

Column 3, line 2, "emboding" should read --embodying--.

Column 3, line 20, "existance" should read --existence--.

Column 3, line 30, "existance" should read --existence--.

Column 4, line 1, "sub-systems" should read --sub-systems'--.

UNITED STATES PATENT AND TRADEMARK OFFICE
CERTIFICATE OF CORRECTION

PATENT NO. : 4,625,199

DATED : November 25, 1986

INVENTOR(S) : Math M. J. Pantus

It is certified that error appears in the above—identified patent and that said Letters Patent is hereby corrected as shown below:

Column 4, lines 1-2, "princ-ples" should read --princi-ples--.

Column 5, line 15, "interferring" should read --interfering--.

Column 5, line 31, "process" should read --processor--.

Column 7, line 8, "occuring" should read --occurring--.

Column 7, line 29, "occuring" should read --occurring--.

Column 7, line 66, "occuring" should read --occurring--.

Column 8, line 22, "one of only" should read --one and only--.

Column 8, line 35, "Gunn" should read --gunn--.

Column 10, line 7, "subsystems" should read --sub-systems--.

UNITED STATES PATENT AND TRADEMARK OFFICE
CERTIFICATE OF CORRECTION

PATENT NO. : 4,625,199
DATED : November 25, 1986
INVENTOR(S) : Math M.J. Pantus

It is certified that error appears in the above-identified patent and that said Letters Patent is hereby corrected as shown below:

Column 10, line 23, "characeristic" should read -- characteristic --.

Signed and Sealed this

First Day of March, 1988

*Attest:*

DONALD J. QUIGG

*Attesting Officer*  *Commissioner of Patents and Trademarks*